(12) United States Patent
Fribbs et al.

(10) Patent No.: US 11,548,237 B2
(45) Date of Patent: Jan. 10, 2023

(54) INTERFACE SHIM FIXTURE, AND METHOD USING AN INTERFACE SHIM FIXTURE

(71) Applicant: Raytheon Company, Waltham, MA (US)

(72) Inventors: Chance Fribbs, Marana, AZ (US); Melby Thelakkaden, Queen Creek, AZ (US); Derek M. Newman, Vail, AZ (US)

(73) Assignee: Raytheon Company, Waltham, MA (US)

( * ) Notice: Subject to any disclaimer, the term of this patent is extended or adjusted under 35 U.S.C. 154(b) by 528 days.

(21) Appl. No.: 16/666,620

(22) Filed: Oct. 29, 2019

(65) Prior Publication Data

US 2021/0122122 A1 Apr. 29, 2021

(51) Int. Cl.
| | |
|---|---|
| *B29C 65/78* | (2006.01) |
| *B29C 65/48* | (2006.01) |
| *B29C 65/54* | (2006.01) |
| *B29C 65/00* | (2006.01) |

(52) U.S. Cl.
CPC ...... *B29C 65/7826* (2013.01); *B29C 65/4835* (2013.01); *B29C 65/54* (2013.01); *B29C 66/005* (2013.01); *B29C 66/11* (2013.01)

(58) Field of Classification Search
None
See application file for complete search history.

(56) References Cited

U.S. PATENT DOCUMENTS

| | | | | |
|---|---|---|---|---|
| 4,786,094 A | * | 11/1988 | Barton | F16B 5/128 52/716.6 |
| 6,383,843 B1 | * | 5/2002 | Foong | H01L 24/83 257/E21.511 |
| 2007/0164469 A1 | * | 7/2007 | Brcich | B25H 1/0021 264/138 |
| 2018/0093425 A1 | * | 4/2018 | McKinney | F16B 11/006 |

* cited by examiner

*Primary Examiner* — Christopher T Schatz
*Assistant Examiner* — Adrianna N Konves
(74) *Attorney, Agent, or Firm* — Renner, Otto, Boisselle & Sklar, LLP

(57) ABSTRACT

A method for making a connection between a pair of objects includes using a fixture to hold in place shims used to control the gap thickness between the objects. The gap may be subsequently filled with adhesive that is then cured. The fixture may be a flexible piece of material that is able to withstand the cure environment, for example being able to withstand heat used to cure the adhesive. The fixture may facilitate maintaining the proper gap by holding the shims in their proper places and orientation until the adhesive is cured and the shims are removed. The use of the fixture may improve the uniformity of the gap at less effort, and may reduce defects in the adhesive layer, for example by facilitating removal of the shims without disturbing or damaging the adhesive, such as by pulling the shims straight out of their locations in the gap.

19 Claims, 4 Drawing Sheets

INTERFACE SHIM FIXTURE, AND METHOD USING AN INTERFACE SHIM FIXTURE

GOVERNMENT LICENSE RIGHTS

This invention was made with government support under contract FA8672-15-C-0136 awarded by the Department of Defense. The government has certain rights in the invention.

FIELD OF THE INVENTION

The invention is in the field of methods for joining together objects.

DESCRIPTION OF THE RELATED ART

Shims are sometimes used when coupling together objects, to maintain a gap of desired thickness between the objects. One example is in mounting of an optic, such as a lens, mirror, window, or dome, to a housing or other mount when there is a desire to maintain a gap of uniform thickness. Shims are placed around the periphery of an opening into which the optic or other object is received. The shims are in place to enforce the gap height the optic prior to the bonding of the optic to the housing. Finally, post adhesive cure, the shims are removed.

Problems may develop when the shims shift or fall out before the process is completed. This may occur prior to placement of the adhesive or other bonding material, although it may not be noticed until after the adhesive is cured. This may result in costly rejection of products due to defects in their bonds. In addition, sometimes damage to the adhesive layer occurs as the shims are removed.

Therefore improvements in the process would be desirable.

SUMMARY OF THE INVENTION

A method of shimming objects includes attaching the shims to a fixture to hold the shims in a desired spatial relationship as two objects are brought together, with the shims positioned in a gap between the objects, for instance making the gap uniform (or more uniform) in thickness.

According to an aspect of the invention, a method of making a connection between a pair of objects includes the steps of: mechanically coupling shims to a fixture; placing the fixture and the shims such that the shims but not the fixture rest on a mounting surface of one of the objects; and placing the other of the objects over the mounting surface, with the shims between the objects.

According to an embodiment of any paragraph(s) of this summary, the mechanically coupling the shims to the fixture includes attaching the shims to the fixture.

According to an embodiment of any paragraph(s) of this summary, the mechanically coupling the shims to the fixture includes taping the shims onto the fixture.

According to an embodiment of any paragraph(s) of this summary, the taping the shims onto the fixture includes taping the shims onto a major surface of the fixture.

According to an embodiment of any paragraph(s) of this summary, the fixture is a planar fixture.

According to an embodiment of any paragraph(s) of this summary, the mechanically coupling the shims to the fixture includes planarly orienting the shims along the planar fixture.

According to an embodiment of any paragraph(s) of this summary, the placing the other of the objects over the mounting surface includes creating a gap between the objects, with a height of the gap determined by a thickness of the shims.

According to an embodiment of any paragraph(s) of this summary, the method further includes, after the placing of the other of the objects over the mounting surface, mechanically coupling the objects together by placing a joining material in the gap.

According to an embodiment of any paragraph(s) of this summary, the placing the over material includes placing an adhesive in the gap.

According to an embodiment of any paragraph(s) of this summary, the placing the adhesive includes dispensing the adhesive into the gap.

According to an embodiment of any paragraph(s) of this summary the method further includes curing the adhesive.

According to an embodiment of any paragraph(s) of this summary, the curing the adhesive includes heat curing the adhesive.

According to an embodiment of any paragraph(s) of this summary, material for the fixture is able to withstanding heating from the heat curing without losing integrity.

According to an embodiment of any paragraph(s) of this summary, the placing includes soldering together the objects by placing solder in the gap.

According to an embodiment of any paragraph(s) of this summary, the method further includes, after the mechanically coupling of the objects together, removing the shims from the gap.

According to an embodiment of any paragraph(s) of this summary, the removing the shims from the gap includes pulling the shims out of the gap.

According to an embodiment of any paragraph(s) of this summary, the pulling the shims out of the gap includes pulling the shims out perpendicular to the gap.

According to an embodiment of any paragraph(s) of this summary, the removing the shims includes removing the shims while the shims are still mechanically coupled to the fixture.

According to an embodiment of any paragraph(s) of this summary, the removing the shims includes deforming the fixture.

According to an embodiment of any paragraph(s) of this summary, the pair of objects are an optic, and a housing for receiving the optic.

According to another aspect of the invention, a device for maintaining a gap while joining together objects includes: a fixture; and shims attached to a major surface of the fixture.

According to an embodiment of any paragraph(s) of this summary, the fixture is flexible.

According to an embodiment of any paragraph(s) of this summary, the fixture and the shims are made of the same material.

According to an embodiment of any paragraph(s) of this summary, the fixture has a shape corresponding to an opening in one of the objects.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

The annexed drawings, which are not necessarily to scale, show various aspects of the invention.

DETAILED DESCRIPTION

A method for making a connection between a pair of objects includes using a fixture to hold in place shims used to control the gap thickness between the objects. The gap may be subsequently filled with adhesive that is then cured. The fixture is be a flexible piece of material that is able to withstand the cure environment, for example being able to withstand heat used to cure the adhesive. The fixture may facilitate maintaining the proper gap by holding the shims in their proper places and orientation until the adhesive is cured and the shims are removed. The use of the fixture may improve the uniformity of the gap at less effort, and may reduce defects in the adhesive layer, for example by facilitating removal of the shims without disturbing or damaging the adhesive, such as by pulling the shims straight out of their locations in the gap. The objects may be an optic, and a housing for receiving the optic.

Suitable fixtures may be created as part of the method for making the connection between the objects. The fixture may be created, for example, by cutting from a sheet of fixture material a desired shape corresponding to an opening in one of the objects for receiving the other object. The perimeter of the fixture may be made slightly smaller than the opening. When shims are attached to major surfaces of the fixture, extending out over the perimeter, the shims and fixture may be placed over the opening, with the shim-laden fixture held in place only by contact between the shims on a mounting surface surrounding the opening, without the fixture in contact with the mounting surface.

More broadly, the fixture and the shims may be used in joining together a pair of objects, maintaining a gap for introduction of a joining material. The fixture may be made of a material that withstands subsequent processing of the joining material.

Figure 1:
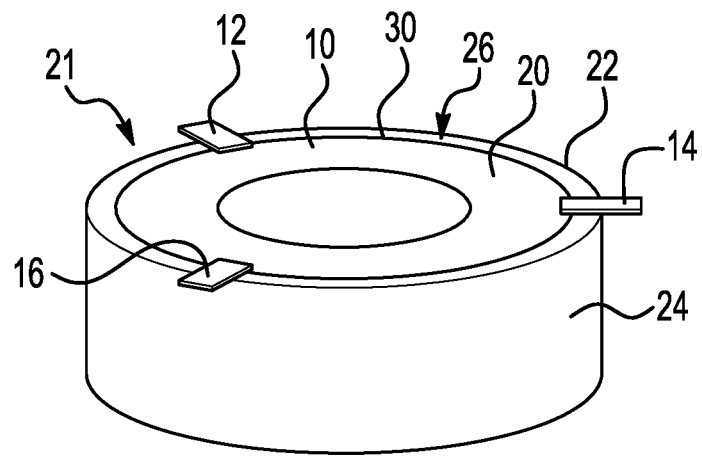
FIG. 1 is an oblique view of a shimmed-fixture device placed over an object, for use in a method to an embodiment of the invention.

Referring now to FIG. 1, a fixture 10 may be employed in a method of connecting or mechanically coupling together (joining) a pair of objects. A series of shims 12, 14, and 16 are attached to a major surface 20 of the fixture 10, forming a shimming or gap-maintaining device 21. The shims 12-16 are configured/intended to be place in a gap between the objects. Toward this end the shims 12-16 may be attached to the fixture 10 such that the shims 12-16 rest on a mounting surface 22 of an object 24, such as a housing. The mounting surface 22 in the illustrated embodiment is an edge that surrounds an opening 26 for receiving another object, such as an optic. The term "optic" is used broadly here to indicate any of a variety of optical elements, including lenses, mirrors, windows, and domes. Such optics may be relatively fragile, so that it is advisable that care be taken in their mounting, to avoid stresses on the optic transmitted from the housing, for example from mechanical forces on the housing or thermal stresses caused by different coefficients of expansion between the optic and the housing.

In the illustrated embodiment the opening 26 is round, but many other shapes are possible for the opening. The shims 12-16 may be other than evenly spaced along the mounting surface. There may be a different number of shims than in the illustrated embodiment.

The fixture 10 may have a similar shape to that of the opening 26. More precisely, a perimeter 30 of the fixture 10 may have a similar shape to the mounting surface 22. However the perimeter 30 may be smaller than the mounting surface 22, such that when the fixture 10 (with the attached shims 12-16) is placed over the opening 26 the fixture 10 does not overlap with the mounting surface 22. Instead only the shims 12-16 are in contact with the mounting surface 22, and the fixture 10 is supported by the contact between the shims 12-16 and the mounting surface 22.

Figure 2:
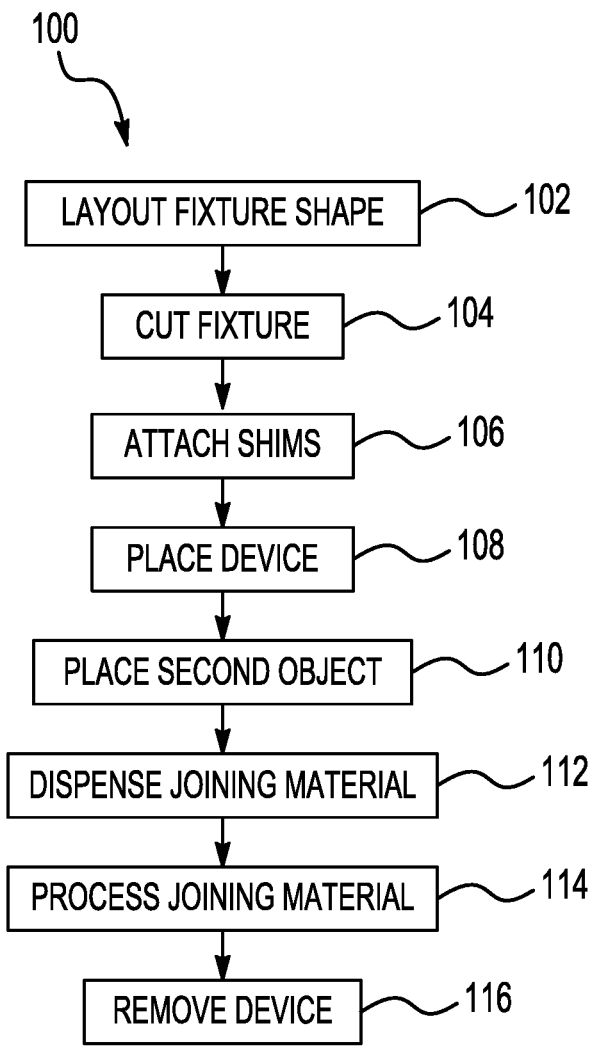
FIG. 2 is a high-level flow chart of a method that uses the device shown in FIG. 1.

The fixture 10 and the shims 12-16 (collectively the device 21) may be used as part of a method 100, outlined in FIG. 2, for connecting or mechanically coupling together a pair of objects, such as an optic and a housing. The method 100 is described as a series of steps 102-116, some of which are illustrated in FIGS. 1 and 3-8.

In step 102 the fixture 10 is configured. The fixture 10 may be configured for a one-time use, or may be configured for re-use. The shape of the fixture 10 may be laid out using a suitable computer drawing tool, based on the shape of the opening 26 and/or the mounting surface 22.

In step 104 the fixture 10 may be cut in the desired shape from a suitable sheet material. This may be done for instance using a laser cutter (not shown) that is guided by the layout created in step 102.

The material for the fixture 10 may be any of a wide variety of suitable materials. It may be advantageous for the fixture 10 to be made of a flexible material to facilitate removal of the shims 12-16 (FIG. 1), as described further below. Another advantageous property of the material for the fixture 10 is an ability to withstand the cure environment for the adhesive during a cure process (or the environment for other processes for joining together the objects), also described further below.

The fixture 10 may be made of the same material as that of the shims 12-16. Even if made of the same material, the fixture 10 may have a different thickness than that of the shims 12-16, either thicker or thinner. Alternatively the fixture 10 may be made of a different material from that of the shims 12-16.

Examples of suitable materials for the fixture 10 include polytetrafluoroethene (PTFE) and other suitable plastics. Desirable characteristics including flexibility and the ability to withstand heat and/or other environmental conditions.

The fixture 10 may have any of a variety of thicknesses, for example having a thickness of between 0.25 and 0.76 mm (0.010 and 0.030 inches). Many other thicknesses are possible, depending on the properties of the material of the fixture 10 and the desirable capabilities of the fixture 10. The shims 12-16 may have similar thickness, or may have a different thickness, such as being thinner than fixture. It is desirable for the shims 12-16 to be robust enough structurally (strong enough structurally) for the shims 12-16 to support the weight of the fixture 10. If the shims 12-16 are made of the same material as the fixture 10 the shims 12-16 may be thicker than the fixture 10, for example having a thickness of about twice that of the fixture 10. More broadly the quotient of the thickness of the shims 12-16 to that of the fixture 10 may be 1, 1.2, 1.4, 1.5, 1.6, 1.8, 2, 2.2, 2.4, 2.5, 2.6, 2.8, 3, or any range with any of these values as the endpoint. It will be appreciated that different thicknesses and thickness ratios may be involved if the shims 12-16 are made of different material from that of the fixture 10.

Figure 3:
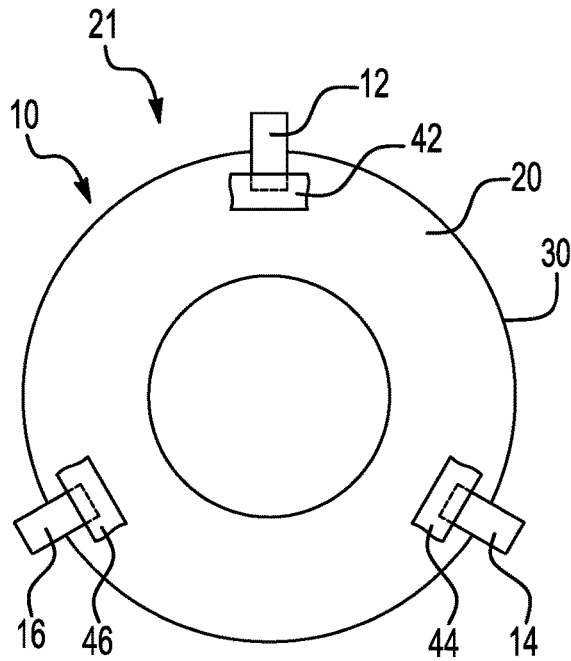
FIG. 3 is a plan view of the device shown in FIG. 1.

In step 106 the shims 12-16 are attached to the fixture 10 to form the device 21, as illustrated in FIG. 3. The shims 12, 14, and 16 may be attached by respective pieces of tape 42, 44, and 46 to the fixture major surface 20 such that the shims 12-16 overhang the fixture perimeter 30. Other mechanisms or means may be used to attach the shims 12-16 to the fixture major surface 20, such as direct adhesive connection. Once the shims 12-16 are attached to the fixture 10 the fixture 10 maintains a desired spatial relationship between and among the shims 12-16, for example preventing potential difficulties that might arise when a single shim becomes dislodged or misaligned when a fixture is not used.

In step 108 the device 21 (the fixture 10 and the attached shims 12-16) are put into place on the object 24, such as a housing for receiving an optic. This arrangement is shown in FIG. 1, and was described in greater detail above.

Figure 4:
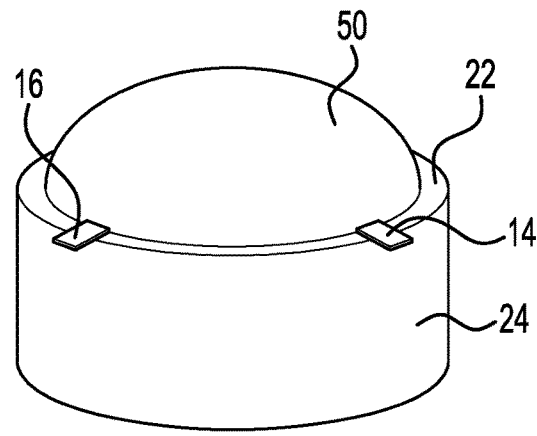
FIG. 4 is an oblique view illustrating another step in the method of FIG. 2.

The optic (or more broadly a second object) 50 is put into place in step 110, illustrated in FIG. 4. The optic 50 is put over the opening 26 (FIG. 1) such that the shims 12-16 are trapped between the objects 24 and 50, along the mounting surface 22. The use of the fixture 10 (FIG. 3) provides a way of facilitating proper alignment and retention of the shims 12-16.

Figure 5:
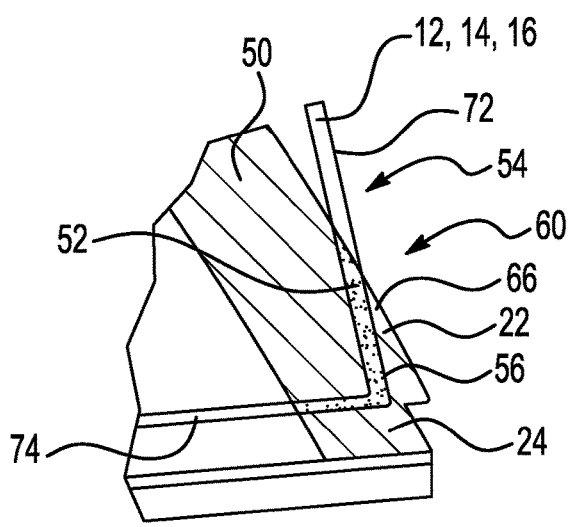
FIG. 5 is a sectional view showing details of the interface between the objects.

With reference now in addition to FIG. 5, the mounting surface 22 on the object 24 may be a close fit with a conforming surface 52 on the object (or optic) 50. The surfaces 22 and 52 may form a gap 54 between them, with the gap 54 subsequently to be filled with some sort of joining material 56 for mechanically coupling, such as fixedly attaching, the objects 24 and 50 together. The joining material 56 in the gap 54 forms a joint 60 between the objects 24 and 50. The joining material 56 may be any of a variety of materials, such as glue, adhesive, epoxy, sealant, or solder. The joint 60 may make a sealed connection between the objects 24 and 50.

Figure 6:
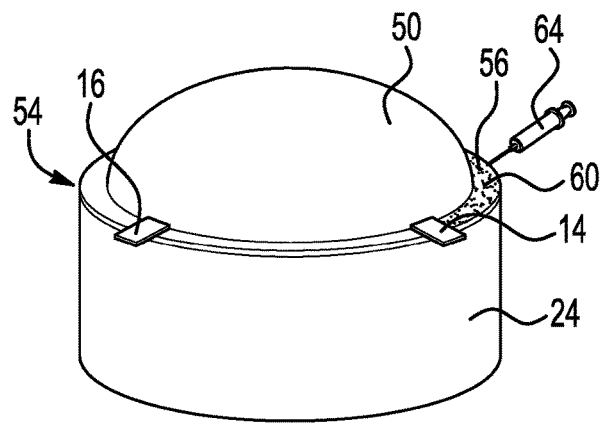
FIG. 6 is an oblique view illustrating yet another step in the method of FIG. 2.

The joining material 56 is deposited to form the joint 60 in step 112 of the method 100, illustrated in FIG. 6. The material 56 may be deposited from a dispensing device 64, such as a glue gun that dispenses adhesive, or a soldering iron that melts and spreads solder. During the process the shims 12-16 maintain uniformity in the gap 54, allowing uniform properties in the resulting joint 60.

With reference again to FIG. 5, the joint 60 may have any of a variety of configurations. In the illustrated embodiment the joint 60 and the gap 54 have an angled cross-sectional shape, with the object (housing) 24 having a lip 66. The shims 12-16 (the shim 12 is shown in FIG. 5) flex to conform to the shape of the gap 54, with (for example) an outer part 72 of the shim 12 vertical, and an inner part 74 of the shim 12 horizontal. The shim inner parts, such as the inner part 74, may be in the same plane as that of the fixture 10. Further, the shims 12-16 (FIG. 1) may be parallel, or substantially parallel, to an inner surface of the joint 60, such that the shims 12-16 may be removed from the joint 60 in the plane of the shims 12-16 (and in or substantially parallel to a plane of the fixture 10). This facilitates eventual removal of the shims 12-16 (described further below) without damaging or disrupting the joint 60.

Figure 7:
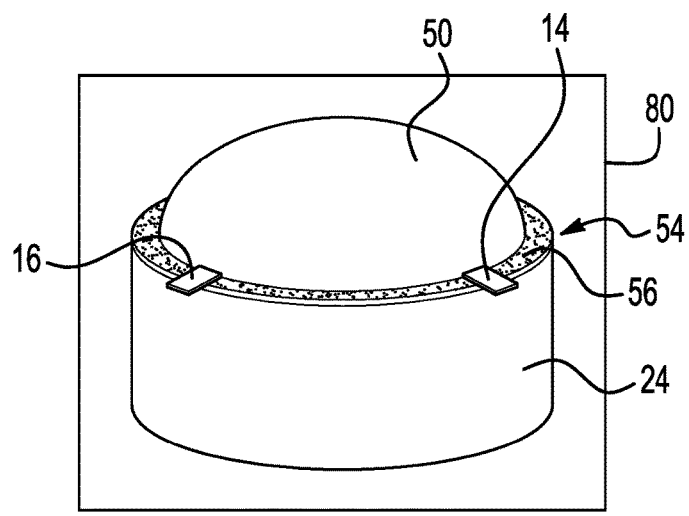
FIG. 7 is an oblique view illustrating still another step in the method of FIG. 2.

Prior to removal of the shims 12-16 there may be a need to process further the material of the joint 60, for example by curing an adhesive or cooling and solidifying solder. An example of this processing (step 114 of the method 100) is illustrated in FIG. 7, with the objects 24 and 50, the fixture 10 (FIG. 3) and the shims 12-16, and the joining material 56 in the gap 54 between the objects 24 and 50, all placed within a curing oven 80. The oven 80 may be set at a temperature desirable for curing an adhesive used as the joining material 56, and the cure time used may be suitable for curing the adhesive. As discussed above, the fixture 10 (and the shims 12-16) may be made of material that is able to withstand the heat used in the curing operation.

More broadly, the device may be subjected to some processing environment, heating being only one example of a processing environment. The processing environment may be part of the depositing, for example the heat used in depositing solder. Processing environments may have other characteristics, for example exposure to chemicals or a specified atmosphere. The material for the fixture 10 may be selected to withstand this processing environment. The material for the shims 12-16 also may be chosen to allow the shims 12-16 to maintain the gap 54 during the processing.

Figure 8:
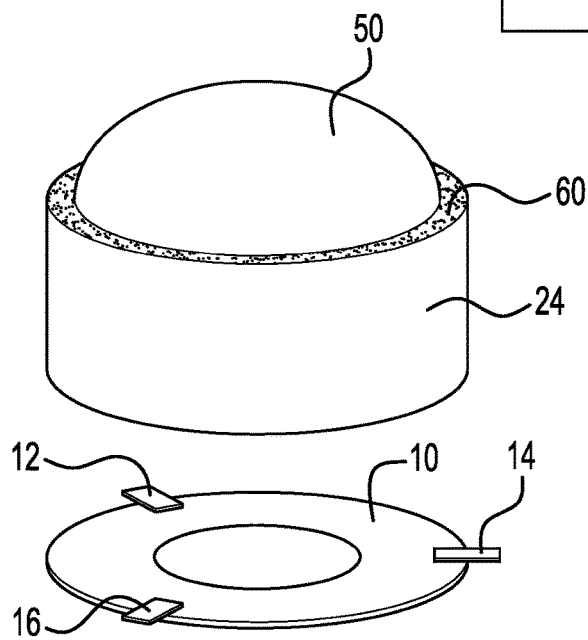
FIG. 8 is an oblique view illustrating a further step in the method of FIG. 2.

Finally, in step 116, illustrated in FIG. 8, the shims 12-16 are removed along with the fixture 10. The fixture 10 may be accessible through one of the objects, for example through the underside of object (housing) 24. The flexibility of the fixture 10 may aid in its removal, for example allowing the fixture 10 to be collapsed and/or deformed to fit through an opening (not shown) that is smaller than the fixture 10.

The shims 12-16 may be removed from the joint 60 while still attached to the fixture 10. As discussed above, the removal may include disengaging the shims 12-16 from the joint 60 by pulling the shims 12-16 in directions perpendicular to where the shims 12-16 enter the joint 60. This facilitates removal of the shims 12-16 without causing damage or disruption to the joint 60. Further, the use of the fixture 10 helps maintain the desired locations of the shims 12-16, to facilitate successful removal of the shims 12-16 without damage to the joint 60.

When shims are individually placed, without use of a fixture, additional shims may be placed in order to provide redundancy against the possibility of shims shifting position or falling out of place entirely. In addition the fixing of location of the shims 12-16 along the fixture 10 may provide better reproducibility of joints for different units, as well as facilitating uniformity of joints in individual installations.

Figure 9:
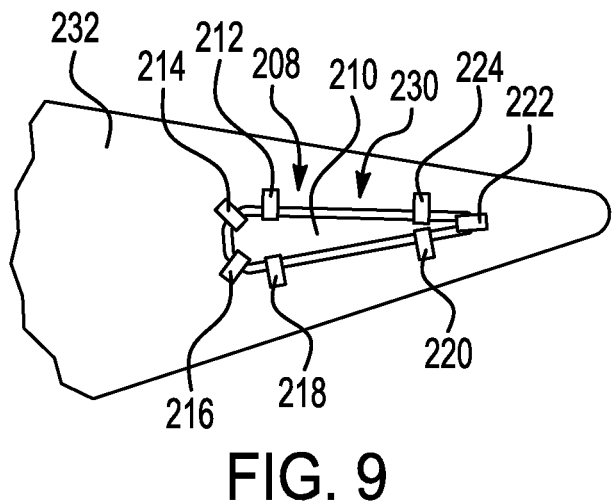
FIG. 9 is an oblique view of another shimmed-fixture device in accordance with an embodiment of the invention.
Figure 10:
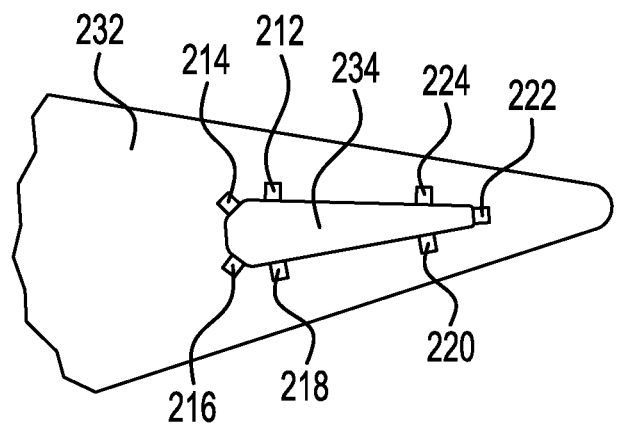
FIG. 10 is an oblique view showing the installation of FIG. 9 with a second object (a window) over an opening of a first object (a nose cone).

The fixture may have any of a variety of other suitable shapes. FIGS. 9 and 10 show an alternative shimming device 208 where an irregularly shaped fixture 210 is used to hold shims 212, 214, 216, 218, 220, 222, and 224 in place in an opening 230 in a nose cone 232. A window 234 (FIG. 10) is then placed over the opening 230, with an adhesive or other joining material used to fill a gap between the nose cone 232 and the window 234 bond line spacing is maintained by the shims 212-224.

Figure 11:
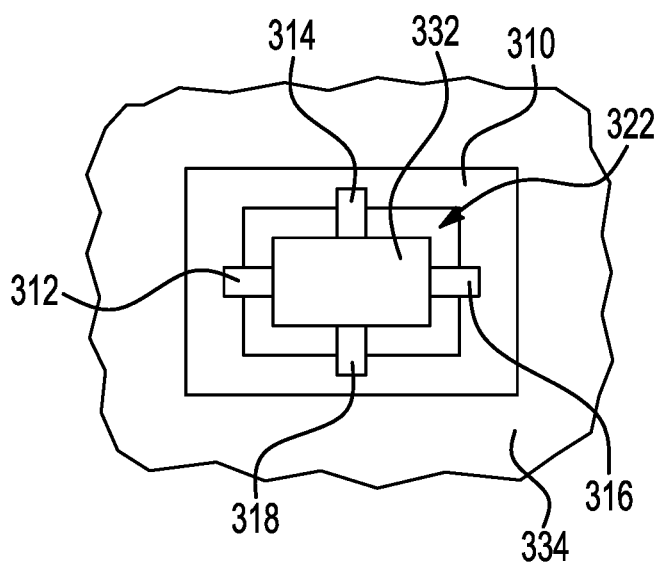
FIG. 11 is a plan view showing another installation with a shimmed-fixture device in accordance with an embodiment of the invention.

FIG. 11 shows another possible use for a flexible fixture with shims, with a fixture 310 used to hold shims 312, 314, 316, and 318 that maintain a gap 322 between a circuit card component 332 and a circuit card 334 to which the component 332 is mounted. The fixture 310 fits around the component 332 with the shims 312-318 directed inward into the gap 322. The shims 312-318 maintain the gap 322 during the connection of the component 332 to the circuit card 334, such as by soldering. Following the connection process the fixture 310 and the shims 312-318 are removed.

It should be appreciated that fixtures and methods described herein may be used in a wide variety of other situations, such as bonding of sensors and cameras, to give two non-limiting examples. Other sorts of face bonding situations may also use these techniques, for example to increase uniformity and decrease risk (e.g., the risk of defects) in face bonding.

The fixture advantageously allows more regular placement of shims, which may lead to better quality mechanical connections such as bonds, and/or more repeatable and uniform mechanical connections. The use of the fixture may provide added interface stability between the objects that are joined together, and may aid in migration of the joining material (bonding material). The flexibility of the fixture may facilitate removal of the shims, and may facilitate avoiding disturbance and/or damage to a bond as the shims are removed.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method of making a connection between a pair of objects, the method of comprising:

mechanically coupling shims to a fixture;

placing the fixture and the shims such that the shims but not the fixture rest on a mounting surface of one of the objects; and placing the other of the objects over the mounting surface, with the shims between the objects, and with the fixture not in direct contact with the objects.

2. The method of claim 1, wherein the mechanically coupling the shims to the fixture includes attaching the shims to the fixture.

3. The method of claim 2, wherein the attaching the shims to the fixture includes taping the shims onto the fixture.

4. The method of claim 3, wherein the taping the shims onto the fixture includes taping the shims onto a major surface of the fixture.

5. The method of claim 1, wherein the fixture is a planar flat fixture; and wherein the mechanically coupling the shims to the flat fixture includes planarly orienting the shims along the planar flat fixture.

6. The method of claim 1, wherein the placing the other of the objects over the mounting surface includes creating a gap between the objects, with a height and/or centration of the gap determined by a thickness of the shims.

7. The method of claim 6, further comprising, after the placing of the other of the objects over the mounting surface, mechanically coupling the objects together by placing a joining material in the gap.

8. The method of claim 7, wherein the placing the joining material includes placing an adhesive in the gap.

9. The method of claim 8, wherein the placing the adhesive includes dispensing the adhesive into the gap.

10. The method of claim 8, further comprising curing the adhesive.

11. The method of claim 10, wherein the curing the adhesive includes heat curing the adhesive.

12. The method of claim 11, wherein material for the fixture is able to withstanding heating from the heat curing without losing integrity.

13. The method of claim 7, wherein the placing includes soldering together the objects by placing solder in the gap.

14. The method of claim 7, further comprising, after the mechanically coupling of the objects together, removing the shims from the gap.

15. The method of claim 14, wherein the removing the shims from the gap includes pulling the shims out of the gap.

16. The method of claim 15, wherein the pulling the shims out of the gap includes pulling the shims out perpendicular to the gap.

17. The method of claim 14, wherein the removing the shims includes removing the shims while the shims are still mechanically coupled to the fixture.

18. The method of claim 17, wherein the removing the shims includes deforming the fixture.

19. The method of claim 1, wherein the pair of objects are an optic, and a housing for receiving the optic.

* * * * *